United States Patent [19]

Nencini et al.

[11] Patent Number: 5,390,556
[45] Date of Patent: Feb. 21, 1995

[54] CONTROL SYSTEM FOR THE RECTILINEAR VERTICAL RECIPROCATING MOVEMENT IN A NEEDLING MACHINE

[75] Inventors: Massimo Nencini, Via Macallé, 39; Antonio Nencini, Via Spartitoio, 145, both of 51100 Pistoia; Graziano Nencini, Pistoia; Carlo Santi, Pistoia; Raffaele Vezzosi, Pistoia, all of Italy

[73] Assignees: Massimo Nencini; Antonio Nencini, both of Pistoia, Italy

[21] Appl. No.: 182,094

[22] Filed: Jan. 18, 1994

[30] Foreign Application Priority Data

May 19, 1992 [IT] Italy .................... MI92A 001201

[51] Int. Cl.6 .................... D04H 18/00; F16C 11/04
[52] U.S. Cl. .................... 74/38; 74/44; 28/113
[58] Field of Search .................... 74/38, 42, 44, 45, 46, 74/48; 464/110, 112; 28/113, 114

[56] References Cited

U.S. PATENT DOCUMENTS

| | | | |
|---|---|---|---|
| 739,427 | 9/1903 | Klocke | 74/38 |
| 1,783,403 | 12/1930 | Candee . | |
| 2,688,296 | 9/1954 | Danly et al. | 74/38 |
| 2,896,457 | 7/1959 | Longfield | 74/44 X |
| 3,112,657 | 12/1963 | Huck | 74/44 X |
| 3,923,313 | 12/1975 | Bailey . | |
| 4,777,706 | 10/1988 | Stanislaw | 28/113 X |
| 4,800,767 | 1/1989 | Abrahamson | 74/38 |

FOREIGN PATENT DOCUMENTS

| | | |
|---|---|---|
| 1560026 | 3/1969 | France . |
| 2202180 | 5/1974 | France . |
| 2393095 | 12/1978 | France . |
| 438855 | 12/1926 | Germany . |
| 2168422 | 6/1986 | United Kingdom . |

Primary Examiner—Clifford D. Crowder
Assistant Examiner—John J. Calvert
Attorney, Agent, or Firm—Ostrolenk, Faber, Gerb & Soffen

[57] ABSTRACT

Rectilinear vertical reciprocating movement is transmitted to the needle-holder beam of a needling machine by a crank mechanism preferably comprised of two horizontal auxiliary connecting rods hinged to a support of the beam. The two auxiliary connecting rods are mounted to the two sides of the needle-holder beam and support. Each auxiliary rod includes an end hinged to a related main connecting rod, with the other end being joined to the structure of the machine by a sliding block and two conjugate profiles. One of the profiles is fixed and the other profile is mobile. The profiles form a rolling coupling, so that each sliding block that is hinged to the related ancillary connecting rod slides when the crank mechanism runs between two extreme axial positions. Simultaneously, each profile of the ancillary connecting rod rolls on the fixed conjugate profile to remain constantly in contact therewith, along lines that are always located on the horizontal plane in different vertical contact lines through the center of the main connecting rod small end.

17 Claims, 6 Drawing Sheets

CONTROL SYSTEM FOR THE RECTILINEAR VERTICAL RECIPROCATING MOVEMENT IN A NEEDLING MACHINE

BACKGROUND OF THE INVENTION

1. Field of the Invention

The present invention relates to a control system for the rectilinear vertical reciprocating movement of a needle-holder beam in a needling machine.

2. Description of the Related Art

It is known that, during operation of needling machines for manufacturing non-woven fabrics, the needle-holder beam must be driven in a vertical reciprocating manner, with the movement of the beam being transmitted by a crank mechanism, usually formed by two counter-rotating connecting rods. Because of evident technical reasons, the movement of the beam must occur in a vertical direction, as the needles it supports must enter the material to be processed with as minimum an inclination as possible.

Various systems are used to control the vertical movement of the needle-holder beam. For example, guides installed on a side of the needle-holder beam support, or systems having adjustable slide gibs have been used. However, in both cases, due to the wide sliding surface, a danger of seizing exists, and, further, when slide gibs are used, it is very difficult to adjust the related clearances. Further, it is possible to have a loss of lubricant, resulting in damage to the product submitted to process.

Guide sliding blocks in an oil bath or mechanisms derived from Watt's parallelogram have also been proposed. However, as in the case of sliding blocks, the danger of loss of oil, resulting in damage to the product, still exists, and, in the case of Watt's parallelogram, the capability of reaching very high running speeds is minimal, and, in any case, the mechanism is complex and cumbersome from the viewpoint of construction and development.

SUMMARY OF THE INVENTION

The present invention overcomes the deficiencies of the prior art, by providing a control system for the needle-holder beam that can avoid all drawbacks of the known systems and at the same time assure perfect vertical movement of the needle-holder beam support.

According to the invention, the system uses, in combination with the transmission crank mechanism, at least two horizontal connecting rods (auxiliary connecting rods) mounted respectively at the two sides of the needle-holder beam support. Each auxiliary connecting rod has an end hinged to the small end of the main connecting rod and the other end coupled to the machine structure by a horizontally actuating sliding block. A mobile profile cooperates with a fixed profile of the structure. Each sliding block is hinged at the end of the related auxiliary connecting rod to allow the connecting rod to oscillate angularly in the vertical plane during operation of the crank mechanism. Each of the conjugate mobile and fixed profiles produce a rolling coupling therebetween, so that during operation, each sliding block slides between two extreme axial positions and contemporaneously each of auxiliary connecting rods rolls on the related conjugate profile to remain constantly in contact therewith along contact lines that are on the horizontal plane formed by the axle of the main connecting rod small end.

According to one embodiment, the profile at the end of each auxiliary connecting rod is a circular profile having a bending radius determined by the distance between the center of the connecting rod small end and the center of the hinging pin of the auxiliary connecting rod to the sliding block, while the conjugate profile of the structure is a flat profile.

Other features and advantages of the present invention will become apparent from the following description of the invention which refers to the accompanying drawings.

DETAILED DESCRIPTION OF THE PREFERRED EMBODIMENT

Figure 1:
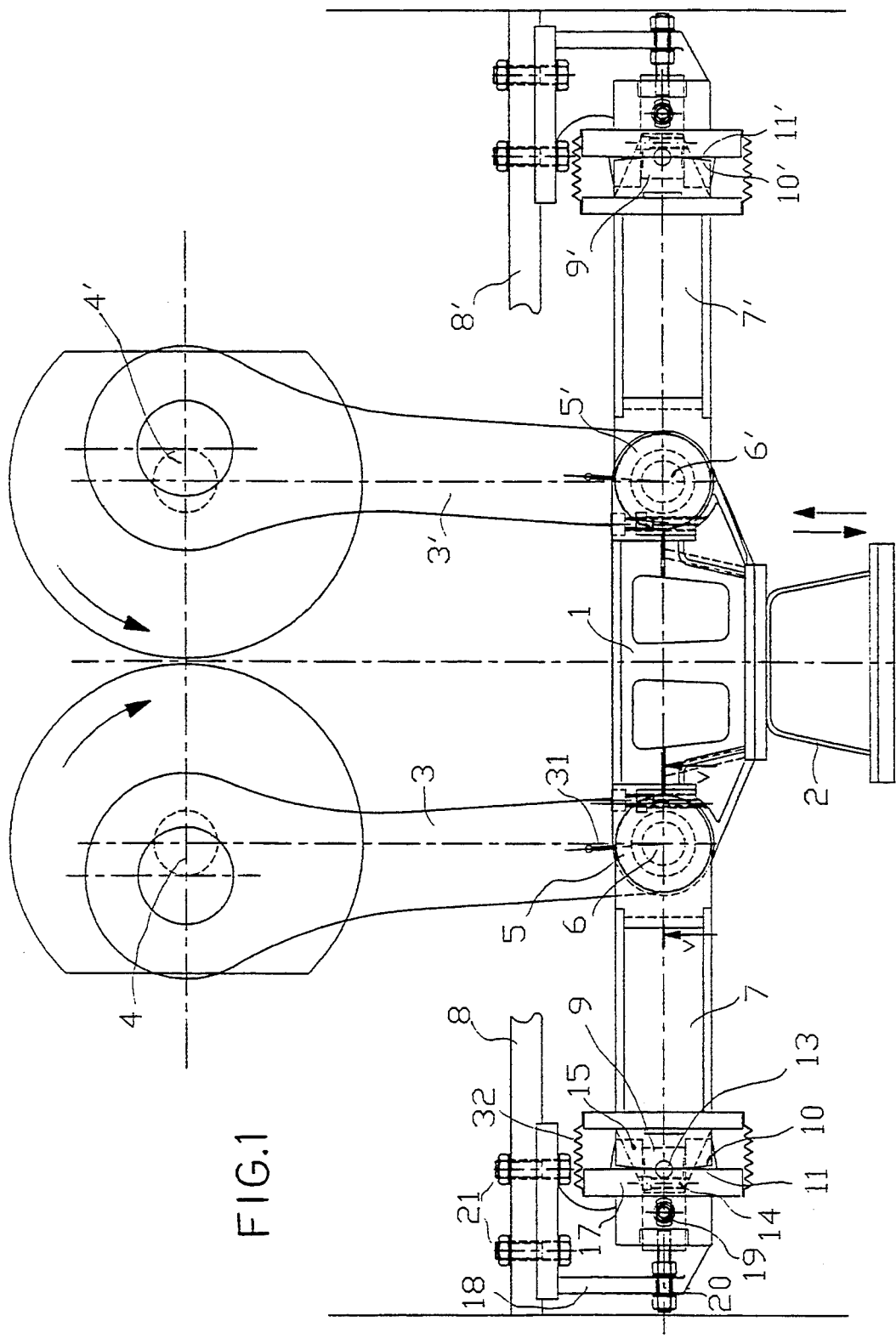
FIG. 1 is a front view of the needling machine of the present invention.

As shown in FIG. 1, the needling machine includes two substantially identical mechanisms, joined to the support 1 of the needle-holder beam 2. Corresponding parts of the two mechanisms shall be indicated with the same reference symbols, but with an apostrophe (') for the parts of one of the mechanisms.

With reference to FIG. 1, the vertical reciprocating movement is transmitted to the support 1 by means of a crank mechanism. The crank mechanism includes two vertical counter-rotating main connecting rods 3,3' driven by the cranks 4,4'. Each rod 3,3' has a small end 5,5' which is connected to the support 1 by means of a rotation pivot 6,6'.

According to the invention, two auxiliary connecting rods 7,7' orthogonal to the main connecting rods 3,3' are each installed at the opposites sides of the support 1. One end of each of the rods 7,7' is hinged by means of the rotation pivots 6,6' to the main connecting rods 3,3'. The other end of each auxiliary connecting rod 7,7' is joined to the machine structure 8 by means of a horizontally sliding block 9,9' and a circular profile 10,10', that co-operates with a fixed flat profile 11,11' of the structure.

The following description shall be made with reference to only one of the mechanisms, but it is obvious that both mechanisms operate in the same manner.

Figure 2:
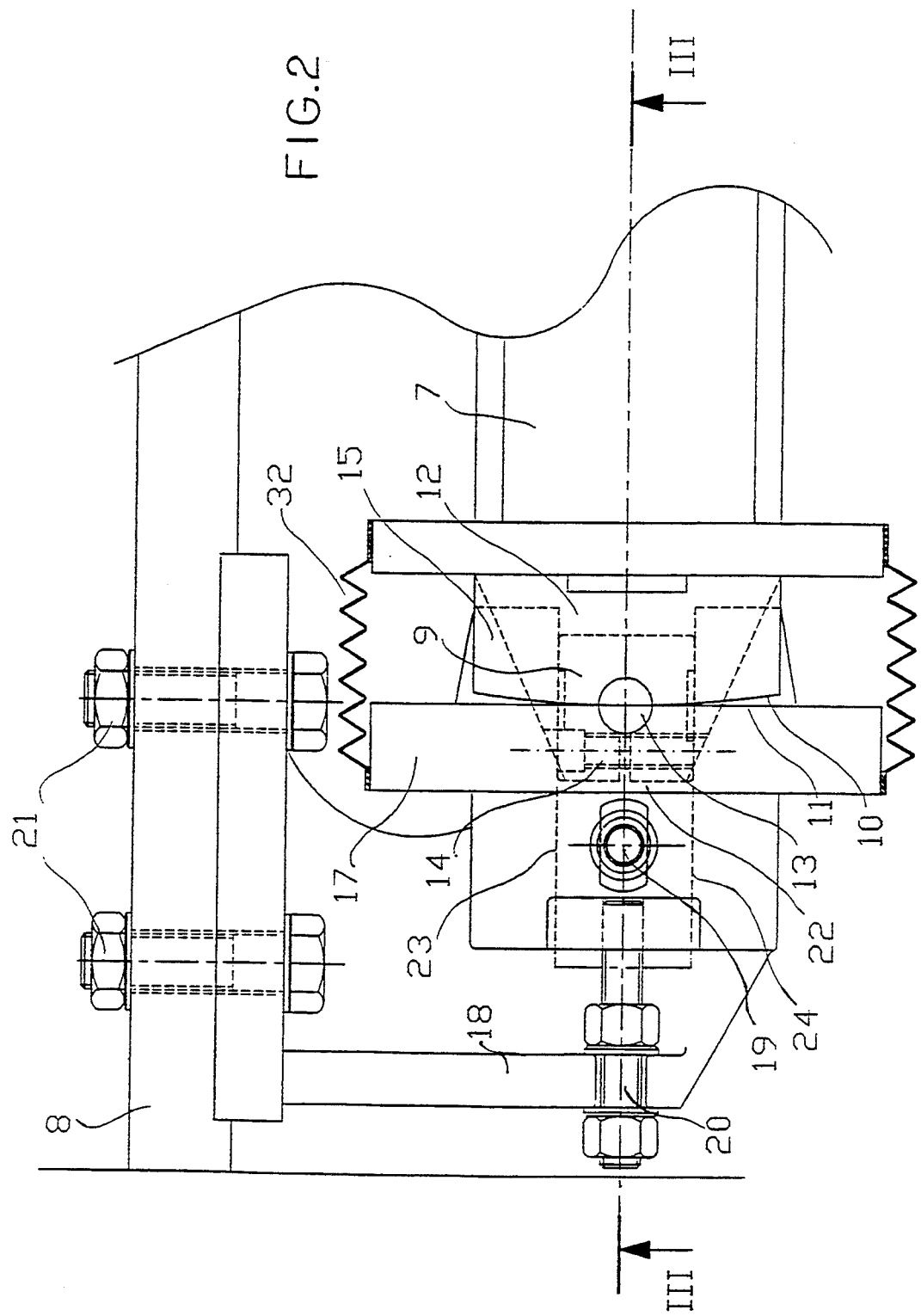
FIG. 2 is an enlarged view of the left end of the auxiliary connecting rod of FIG. 1.
Figure 3:
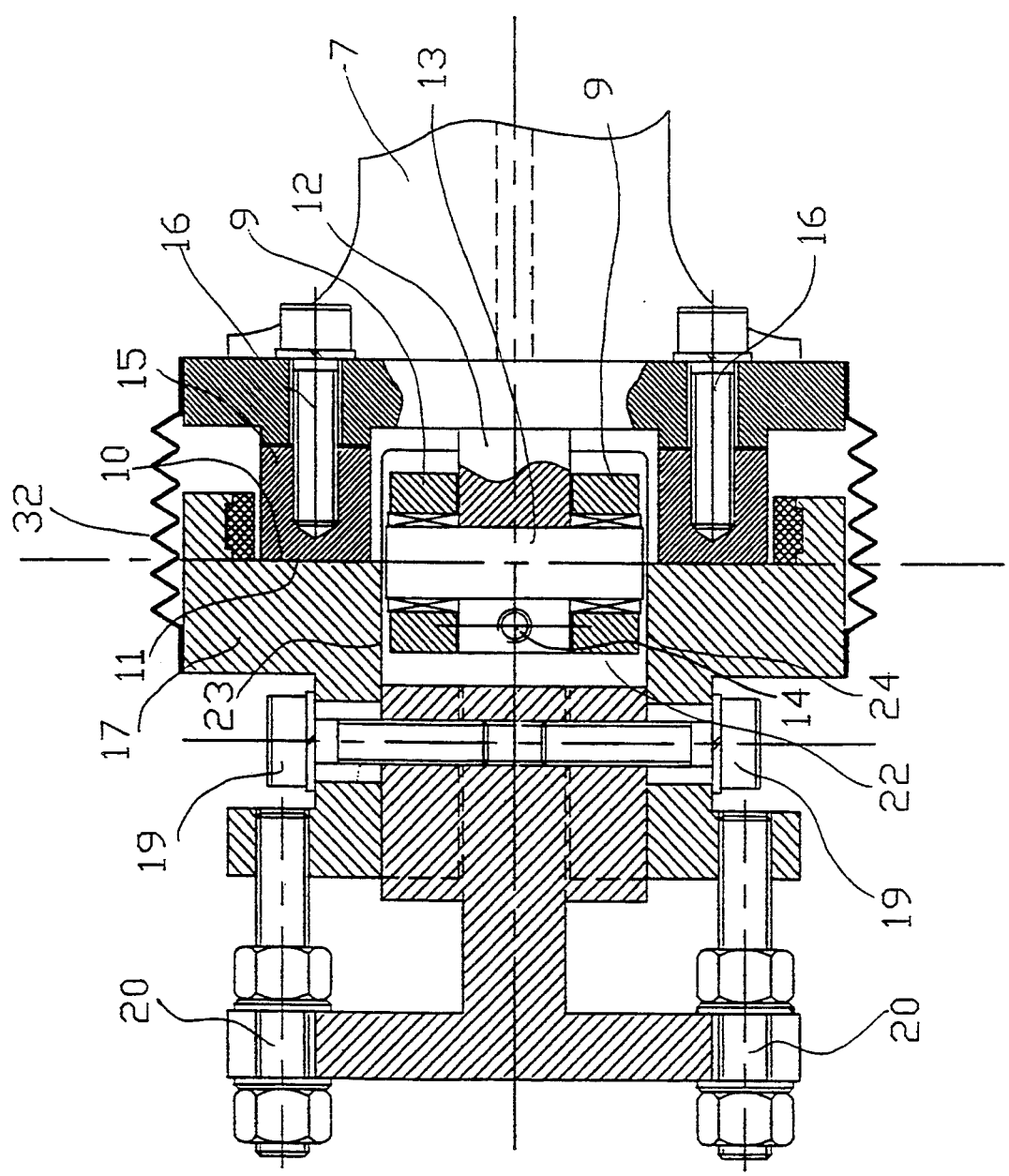
FIG. 3 is a cross-sectional view along line III—III, of FIG. 2.
Figure 4:
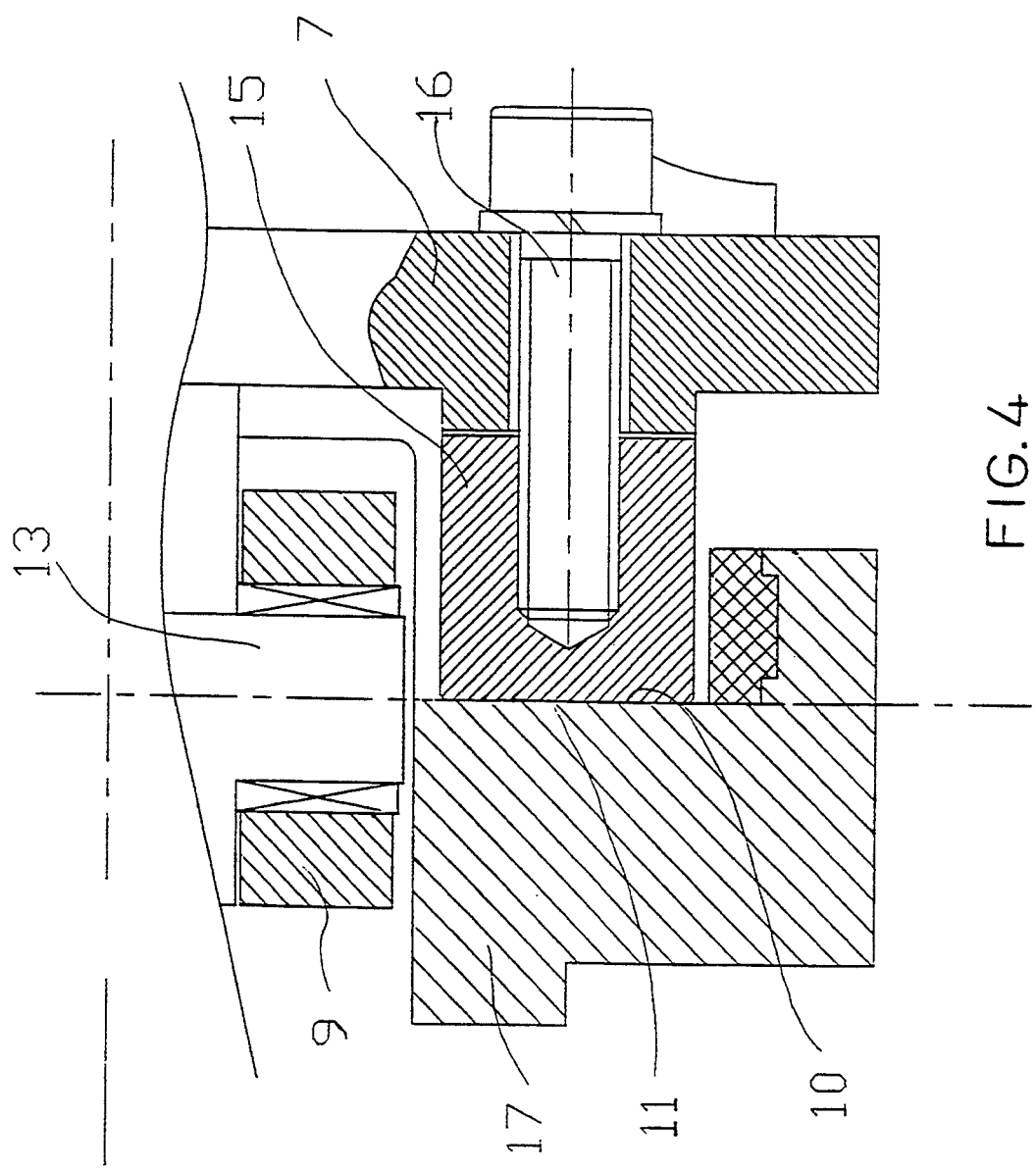
FIG. 4 is an enlarged view of the connection of the circular profile and the auxiliary connecting rod of FIG. 3.

With particular reference to FIGS. 2-4, the sliding block 9 is mounted to an axial appendix 12 of the auxiliary connecting rod 7 by a rotation pivot 13. Rotation pivot 13 crosses appendix 12 and is parallel to the rotation pivot 6 of the main connecting rod 3. Sliding block 9 is formed in two parts that are mounted around the protruding ends of the pivot 13 by bearings and locked together by a clamp 14.

In one embodiment, circular profile 10 has a body 15 fixed to the end of the auxiliary connecting rod 7 by horizontal screws 16. The circular profile 10 has a bending radius equal to the distance between the axle of rotation of pivot 13 of auxiliary connecting rod 7 and the axle of the rotation of pivot 6 of the main connecting rod 3. A fixed flat profile 11 communicates with mobile circular profile 10. Profile 11 has a flat surface perpendicular to the axle of the connecting rod 3 of body 17, which is fixed to an arm 18 of the structure by horizontal screws 19 and 20. Other vertical screws 21 fix the arm 18 to the machine structure 8. The body 17 has a cavity 22, in which the sliding block 9 can slide between two guide walls, upper guide wall 23 and the lower guide wall 24.

During operation of the crank mechanism, the sliding block 9 slides in the cavity 22 between two extreme axial positions. Mobile circular profile 10 rolls on the fixed flat profile 11, and simultaneously, the auxiliary connecting rod 7 is angularly oscillated in a vertical plane, pivoting about the rotation pivot 13. The contact between the profiles 10, 11 occurs along contact lines of parallel horizontal planes in different vertical positions on the fixed surface 11, and by the axle also being in different vertical positions, of the rotation pivot 4 of the main connecting rod 3.

In detail, when the sliding block 9 reaches the extreme internal position, the main connecting rod 3 and the auxiliary connecting rod 7 are in their central or intermediate positions, and when the sliding block 9 is in its extreme external position, the connecting rods are in top dead center or bottom dead center positions.

Figure 6:
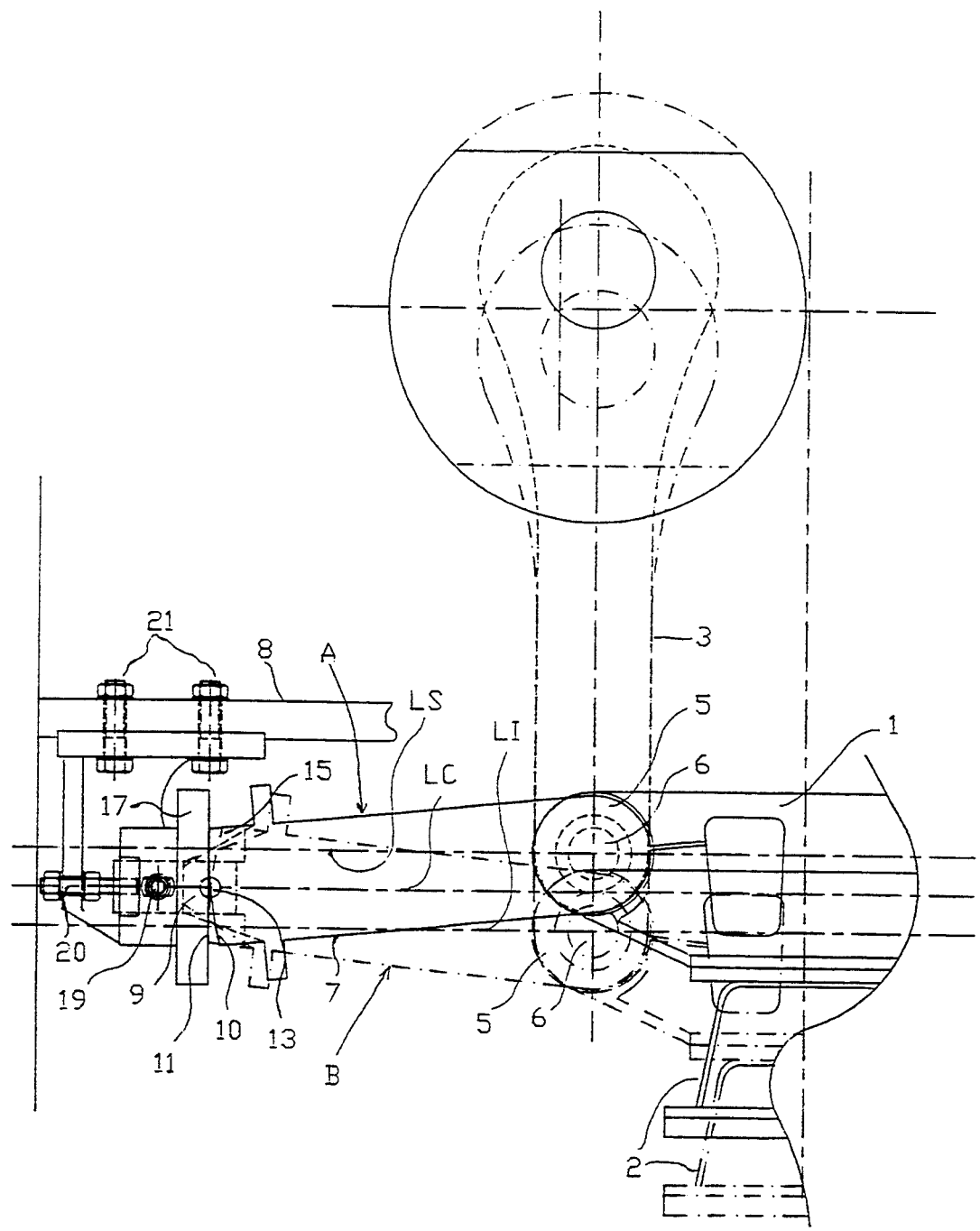
FIG. 6 illustrates one side of the machine of FIG. 1, at the different positions of top and bottom dead center.

The top or bottom dead center positions reached by the connecting rods 3 and 7 when the sliding block 9 is in the extreme external position are shown in the FIG. 6. In FIG. 6, A indicates the top dead center position and B indicates the bottom dead center position. Further, in FIG. 6, LC, LS, LI indicate the outlines of the three parallel planes on which the contact lines between the conjugate profiles 10, 11 are located, respectively, the central position, top dead center position, and bottom dead center position of connecting rods 3 and 7.

The rolling coupling of conjugated profiles 10, 11 forms a main feature of the invention, due to the constant distance between the contact points of the profiles and the center of the small end 5 of main connecting rod 3. The small end 5 of the main connecting rod must necessarily move along a vertical line assuring the perfect vertical motion of the reciprocating movement of the support 1 and needle-holder beam 2.

Figure 5:
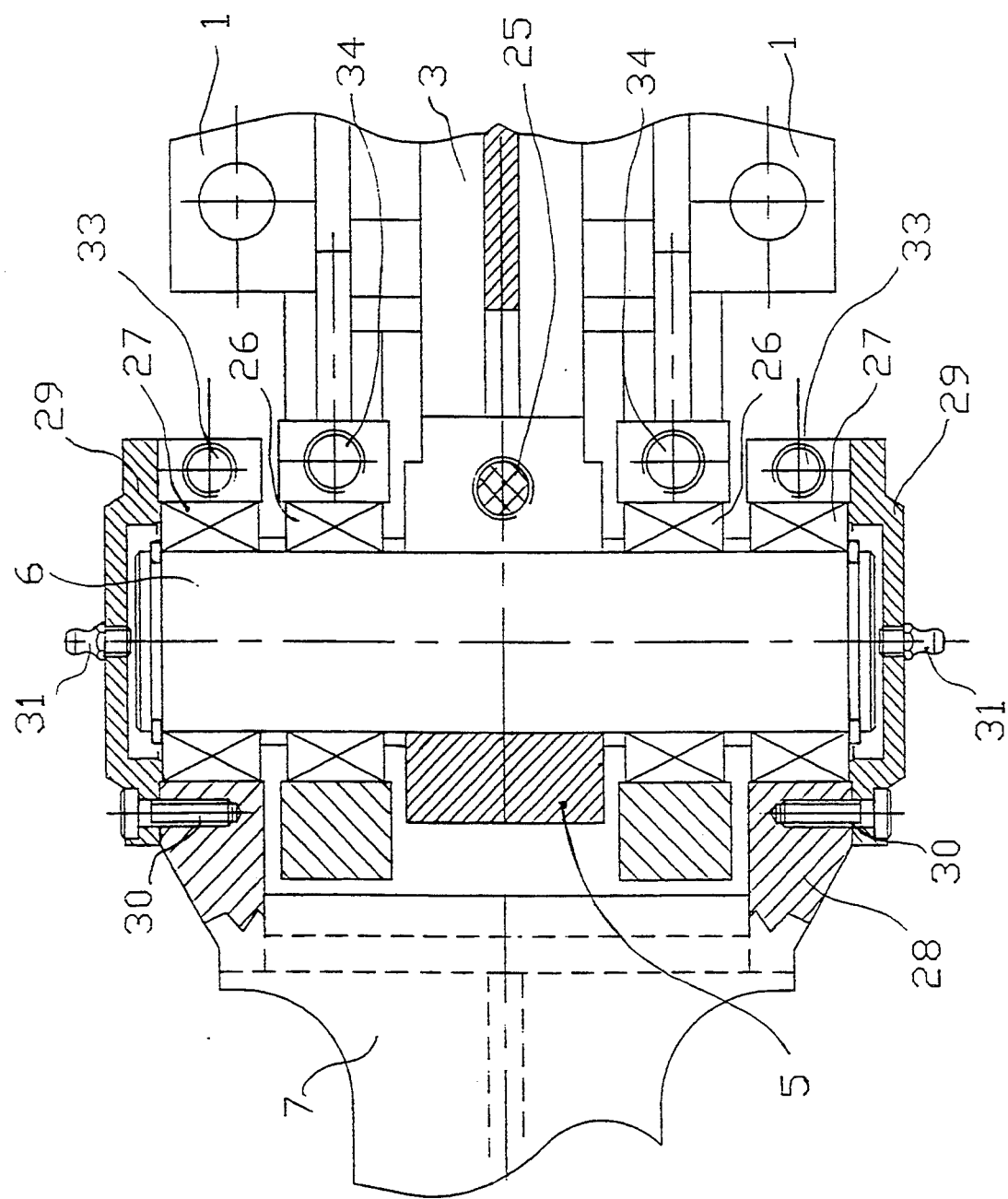
FIG. 5, is a cross-sectional view along line V—V of FIG. 1.

Naturally, perfect vertical operation can be obtained by other means of construction suggested by the invention, particularly by the use of a sole rotation pivot 6 for the connection of the ends of connecting rods 3 and 7 and of the support 1, as shown in FIG. 5.

FIG. 5 shows that the pivot 6 is joined to the small end 5 of the main connecting rod 3 by a locking clamp 25, and to the support 1 of the needle-holder beam 2. Pivot 6 is further joined to the end of the auxiliary connecting rod 7 through the related bearings 26 and 27. In detail, the connecting rod 7 is joined to the pivot 6 by fork end 28. The bearings are locked on the pivot 6 by means of screws 33 and 34.

The two ends of the pivot 6 are closed by two protective covers 29 that are fixed to the fork 28 by screws 30. The covers are provided with lubricators or unions 31 for the introduction of lubrication grease into the inside of the covers 29.

Bodies 15 and 17 of the conjugated profiles 10, 11 are made of materials having a high mechanical strength to prevent reduction in wear. The friction between conjugated profiles 10, 11, which are in rolling contact, is of the rolling type, while the friction between the sliding block 9 and guide surfaces 23 and 24 is of the sliding type. The sliding friction has a minimum value, with the sliding between the parts occurring along a short path, in the order of only 1-2 millimeters.

In order to allow quick and easy replacement of bodies 15 and 17 with new parts, the connection to the auxiliary connecting rod 7 is made by screws 16 and 19 which, while serving as detachable fastening means, also function as adjustment means for adjusting the position of the bodies. Screws 20 and 21 allow the fastening of parts and further the necessary adjustment operations.

To keep the end of the auxiliary connecting rod 7 and the grease introduced therein within the inside of the body 17, so as to lubricate the profiles 10, 11 and the sliding block 9, and to avoid any escape of grease which could possibly damage the material being processed, a cylindrical projection binding 32 is provided. As shown in FIG. 2, binding 32 comprises a bellows fixed to the outside of bodies 15, 17. The bellows allows the small end 5 of the main connecting rod 3 to traverse, caused by the rolling action of the circular profile 10 on the flat profile 11. Further, the bellows guarantees protection against dust.

The control device of the present invention allows adjustments to be made very simply by the screws. Moreover, the rotation speed of the mechanism can be high, as the surfaces in contact are reduced to a minimum and the angular oscillations of auxiliary connecting rods 7 are only of a few degrees, in the order of 4°-5°. Further, loss of lubricant does not occur because the grease is kept within by protective bellows 32. Due to optimal lubrication that is achieved in this manner, jamming between the various parts of the device is avoided.

The invention is shown with reference to a crank mechanism having two counter-rotating connecting rods. However, a crank mechanism having one main connecting rod can be used. In this case, an auxiliary connecting rod 7 shall be hinged to the small end 5 of the main connecting rod 3, while the other auxiliary connecting rod 7 shall be simply hinged to the support 1. Both connecting rods shall be coupled by the second ends to the structure in the manner described above.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A control system for rectilinear vertical reciprocating movement of a needle-holder beam in a needling machine, the vertical reciprocating movement being transmitted to the needle-holder beam from a motor through a crank mechanism connected to a support of the needle-holder beam, the crank mechanism comprising:

one or more main connecting rods, each of the main connecting rods having first and second opposed ends, the first end of each of the main connecting rods being pivotally connected to the support of the needle-holder beam;

at least two auxiliary connecting rods, each of the auxiliary connecting rods having first and second opposed ends, the first end of each of the auxiliary connecting rods being pivotally connected to the first end of the respective main connecting rod;

a movable sliding block pivotally connected to the second end of each of the auxiliary connecting rods for attaching the respective auxiliary connecting rod to a structure of the needling machine and for allowing the auxiliary connecting rods to angularly oscillate in a vertical plane during operation of the crank mechanism;

a mobile profile fixed to the second end of each of the auxiliary connecting rods;

a fixed profile communicating with each mobile profile, each fixed profile being attached to the needling machine structure, each mobile profile making a rolling coupling with the respective fixed profile such that when the crank mechanism is operated, each mobile coupling rolls along and remains in contact with the respective fixed profile along contact lines which extend along parallel horizontal planes, causing the auxiliary connecting rods to simultaneously angularly oscillate in the vertical plane.

2. The system of claim 1, wherein the first end of each of the main connecting rods is connected to the support of the needle-holder beam by a first rotation pivot and each mobile profile is pivotally connected to an appendix of the second end of the respective auxiliary connecting rod by a second rotation pivot, the Second rotation pivot being parallel with the first rotation pivot of the respective main connecting rod.

3. The system of claim 2, wherein each sliding block is joined to the axial appendix of the respective auxiliary connecting rod by a clamp.

4. The system of claim 2, wherein each mobile profile is a circular profile having a bending radius equal to a distance between the first and second rotation pivots, and each fixed profile is a flat profile.

5. The system of claim 4, wherein each mobile, circular profile has a circular sector surface comprised of a first body fixed to the second end of the respective auxiliary connecting rod.

6. The system of claim 5, further comprising first fastening means for fixing the first body to the second end of the respective auxiliary connecting rod and for adjusting a position of the first body thereto.

7. The system of claim 5, wherein each flat, fixed profile has a flat surface comprised of a second body fixed to an arm of the needling machine structure.

8. The system according to claim 7, further comprising second fastening means for fastening the second body to the respective arm and for adjusting the position of the second body with respect to the arm.

9. The system of claim 7, wherein the second body includes guide walls forming a cavity in which the respective sliding block moves between two axial positions.

10. The system of claim 7, further comprising third fastening means for fixing the arm to the needling machine structure and for adjusting the position of the arm thereto.

11. The system of claim 5, further comprising protection bellows for protecting each of the first and second bodies against dust and loss of lubricant.

12. The system of claim 2, wherein each first rotation pivot pivotally attaches the first end of each of the main connecting rods and the second end of each of the auxiliary connecting rods to the needling machine structure.

13. The system of claim 12, wherein the second end of each of the auxiliary connecting rods comprises a fork connected to the respective first rotation pivot.

14. The system of claim 2, wherein the first end of each of the main connecting rods is connected to the first rotation pivot by a clamp.

15. The system of claim 2, wherein the first end of each of the main connecting rods is protected by covers through which lubrication grease is introduced.

16. The system of claim 1, comprising two counter-rotating main connecting rods, the first ends of the main connecting rods being connected to opposite sides of the needle-holder beam and to the first ends of the respective auxiliary connecting rods.

17. The system of claim 2, comprising only one main connecting rod, wherein the first end of the main connecting rod is pivotally connected to an intermediate point of the support of the needle-holder beam, and a pair of auxiliary connecting rods respectively connected to each side of the support, one auxiliary connecting rod of each pair on each side of the support being pivotally connected at the first end to the first rotation pivot and the second end of the one auxiliary connecting rod being attached to the needling machine structure by the respective sliding block.

* * * * *